(12) United States Patent
Son et al.

(10) Patent No.: US 12,556,887 B2
(45) Date of Patent: Feb. 17, 2026

(54) APPARATUS AND METHOD FOR ESTABLISHING MBS SERVICE SESSION FOR MBS SERVICE PROVISION IN WIRELESS COMMUNICATION SYSTEM

(71) Applicant: Samsung Electronics Co., Ltd., Gyeonggi-do (KR)

(72) Inventors: Jungje Son, Gyeonggi-do (KR); Youngkyo Baek, Gyeonggi-do (KR); Jicheol Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 654 days.

(21) Appl. No.: 17/775,485

(22) PCT Filed: Nov. 6, 2020

(86) PCT No.: PCT/KR2020/015513
§ 371 (c)(1),
(2) Date: May 9, 2022

(87) PCT Pub. No.: WO2021/091307
PCT Pub. Date: May 14, 2021

(65) Prior Publication Data
US 2022/0400358 A1   Dec. 15, 2022

(30) Foreign Application Priority Data
Nov. 7, 2019 (KR) .......................... 10-2019-0142146

(51) Int. Cl.
*H04W 4/06* (2009.01)
*H04L 12/18* (2006.01)
(Continued)

(52) U.S. Cl.
CPC ............. *H04W 4/06* (2013.01); *H04W 76/10* (2018.02); *H04L 12/189* (2013.01); *H04W 80/10* (2013.01)

(58) Field of Classification Search
CPC . H04L 12/189; H04L 65/1073; H04L 65/611; H04L 65/80; H04L 67/51;
(Continued)

(56) References Cited

U.S. PATENT DOCUMENTS

2010/0272004 A1* 10/2010 Maeda ................. H04L 5/0007
370/312
2018/0109911 A1* 4/2018 Chandramouli ........ H04W 4/06
(Continued)

FOREIGN PATENT DOCUMENTS

| KR | 10-2021-0030715 | 3/2021 |
| WO | WO 2019/047197 | 3/2019 |
| WO | WO 2019/136128 | 7/2019 |

OTHER PUBLICATIONS

PCT/ISA/210 Search Report issued on PCT/KR2020/015513, Feb. 26, 2021, pp. 5.
(Continued)

*Primary Examiner* — Marcus Smith
*Assistant Examiner* — Kai Chang
(74) *Attorney, Agent, or Firm* — The Farrell Law Firm, P.C.

(57) ABSTRACT

The disclosure relates to a $5^{th}$ Generation (5G) or pre-5G communication system for supporting a higher data transfer rate than a $4^{th}$ generation (4G) communication system such as Long Term Evolution (LTE). According to various embodiments of the disclosure, a method for operating an Access and Mobility Management Function (AMF) node in a wireless communication system is provided. The method includes receiving an N2 Multimedia Broadcast Service (MBS) Protocol Data Unit (PDU) session setup request message for establishing an MBS session from a Session Management Function (SMF) node, transmitting the N2 MBS PDU session setup request message to a base station, receiving an N2 MBS PDU session setup response message from the base station, and transmitting the N2 MBS PDU session setup response message to the SMF node.

20 Claims, 10 Drawing Sheets

(51) Int. Cl.
*H04W 76/10* (2018.01)
*H04W 80/10* (2009.01)

(58) Field of Classification Search
CPC ....... H04W 4/021; H04W 4/06; H04W 76/10;
H04W 76/12; H04W 76/40; H04W 80/10;
H04W 88/14; H04W 88/18; H04W 92/24
See application file for complete search history.

(56) References Cited

U.S. PATENT DOCUMENTS

| | | | |
|---|---|---|---|
| 2018/0324740 A1 | 11/2018 | Edge et al. | |
| 2019/0110182 A1 | 4/2019 | Liu | |
| 2019/0158985 A1* | 5/2019 | Dao | H04W 28/04 |
| 2019/0223250 A1* | 7/2019 | Dao | H04W 72/23 |
| 2019/0335534 A1* | 10/2019 | Atarius | H04L 65/1016 |
| 2021/0120462 A1* | 4/2021 | Chen | H04W 8/02 |
| 2022/0322202 A1* | 10/2022 | Li | H04M 15/93 |
| 2023/0362725 A1* | 11/2023 | Condoluci | H04W 76/00 |

OTHER PUBLICATIONS

PCT/ISA/237 Written Opinion issued on PCT/KR2020/015513, Feb. 26, 2021, pp. 8.
Korean Office Action dated Oct. 22, 2025 issued in counterpart application No. 10-2019-0142146, 18 pages.

\* cited by examiner

APPARATUS AND METHOD FOR ESTABLISHING MBS SERVICE SESSION FOR MBS SERVICE PROVISION IN WIRELESS COMMUNICATION SYSTEM

PRIORITY

This application is a National Phase Entry of International Application No. PCT/KR2020/015513, which was filed on Nov. 6, 2020, and claims priority to Korean Patent Application No. 10-2019-0142146, filed in the Korean Intellectual Property Office on Nov. 7, 2019, the entire content of each of which is incorporated herein by reference.

TECHNICAL FIELD

The disclosure relates, in general, to a wireless communication system, and in particular, to an apparatus and method for establishing a Multimedia Broadcast Service (MBS) service session for MBS service provision in the wireless communication system.

BACKGROUND ART

To meet a demand on wireless data traffic which has been in an increasing trend after a $4^{th}$ Generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

DISCLOSURE OF INVENTION

Technical Problem

Based on the aforementioned discussion, the disclosure provides an apparatus and method for establishing a Multimedia Broadcast Service (MBS) service session for MBS service provision in the wireless communication system.

Solution to Problem

According to various embodiments of the disclosure, there is provided a method for operating an Access and Mobility Management Function (AMF) node in a wireless communication system. The method includes receiving an N2 Multimedia Broadcast Service (MBS) Protocol Data Unit (PDU) session setup request message for establishing an MBS session from a Session Management Function (SMF) node, transmitting the N2 MBS PDU session setup request message to a base station, receiving an N2 MBS PDU session setup response message from the base station, and transmitting the N2 MBS PDU session setup response message to the SMF node.

According to various embodiments of the disclosure, there is provided an apparatus of an AMF node in a wireless communication system. The apparatus includes at least one transceiver, and at least one processor. The at least one processor is configured to receive an N2 MBS PDU session setup request message for establishing an MBS session from an SMF node, transmit the N2 MBS PDU session setup request message to a base station, receive an N2 MBS PDU session setup response message from the base station, and transmit the N2 MBS PDU session setup response message to the SMF node.

Advantageous Effects of Invention

An apparatus and method according to various embodiments of the disclosure may be an apparatus and method for establishing a Multimedia Broadcast Service (MBS) service session for MBS service provision in a wireless communication system.

Advantages acquired in the disclosure are not limited to the aforementioned advantages, and other advantages not mentioned herein may be clearly understood by those skilled in the art to which the disclosure pertains from the following descriptions.

BEST MODE FOR CARRYING OUT THE INVENTION

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Hereinafter, the disclosure relates to an apparatus and method for providing subscription data to a terminal to which a non-subscriber is registered in a wireless communication system.

Terms used hereinafter to refer to a signal, a channel, control information, a message, network entities, a component of a device, or the like are exemplified for convenience of explanation. Therefore, the disclosure is not limited to the terms described below, and thus other terms having the same technical meaning may also be used.

In addition, although the disclosure describes various embodiments by using terms used in some communication standards (e.g., 3$^{rd}$ Generation Partnership Project (3GPP)), this is for exemplary purposes only. Various embodiments of the disclosure may be easily modified and applied to other communication systems.

Figure 1:
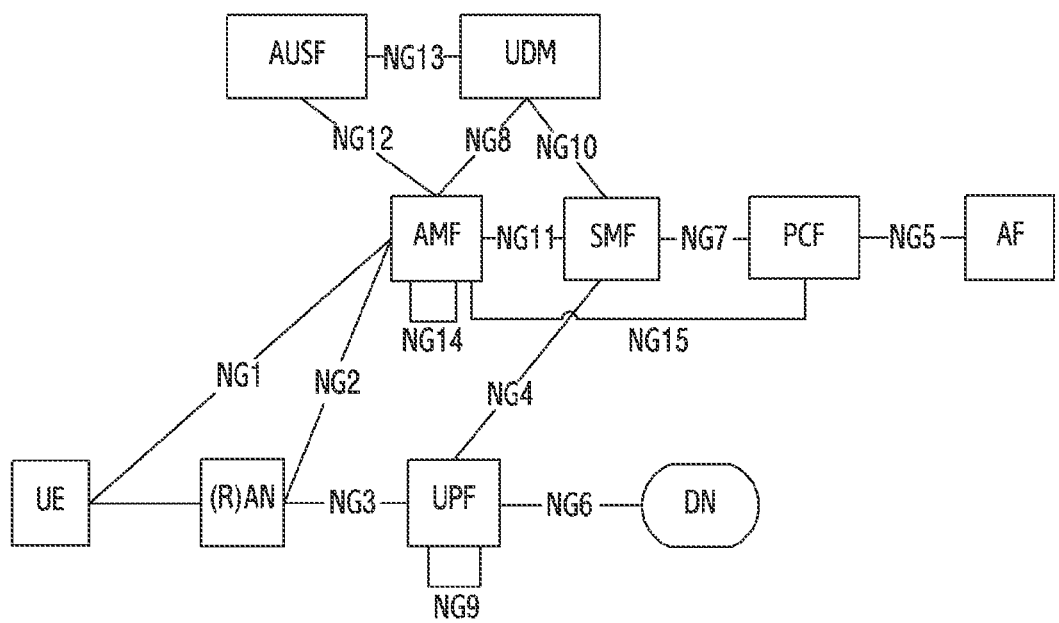
FIG. 1 illustrates an example of a $5^{th}$ Generation (5G) system architecture using a reference point expression in a wireless communication system.

FIG. 1 illustrates an example of a 5G system architecture using a reference point expression in a wireless communication system.

Referring to FIG. 1, the 5G system architecture may include various components (i.e. a Network Functions (NF)). Some of the components exemplified in FIG. 1 include an Authentication Server Function (AUSF), a (core) Access and mobility Management Function (AMF), a Session Management Function (SMF), a Policy Control Function (PCF), an Application Function (AF), a Unified Data Management (UDM), a Data Network (DN), a User Plane Function (UPF), a (radio) Access Network (R)AN, and a terminal, i.e., User Equipment (UE).

Each NF supports the following function.

The AUSF stores data for authentication of the UE.

The AMF provides a function for access and mobility management, and one UE may be basically coupled to one AMF.

Specifically, the AMF supports functions such as signaling between CN nodes for mobility between 3GPP access networks, a termination of a Radio Access Network (RAN) CP interface (i.e., an NG2 interface), a termination of NAS signaling (NG1), NAS signaling security (NAS ciphering and integrity protection), AS security control, registration management (registration area management), connection management, kids mode UE reachability (including control and execution of paging retransmission), mobility management control (subscription and policy), intra-system mobility and inter-system mobility support, network slicing support, SMF selection, lawful intercept (regarding an AMF event and an interface towards an L1 system), provision of a Session Management (SM) message transfer between the UE and the SMF, a transparent proxy for SM message routing, access authentication, access authorization including roaming authority check, provision of Short Message Service (SMS) message transfer between the UE and an SMS Function (SMSF), Security Anchor Function (SAF), and/or Security Context Management (SCM), or the like.

Some or all functions of the AMF may be supported within a single instance of one AMF.

The DN means, for example, an operator service, an Internet access, a 3$^{rd}$ party service, or the like. The DN transmits to the UPF a downlink Protocol Data Unit (PDU), or receives from the UPF a PDU transmitted from the UE.

The PCF provides a function of determining a policy such as mobility management, session management, or the like by receiving information on a packet flow from an application server. Specifically, the PCF supports a function of supporting a unified policy framework to control a network operation, providing a policy rule so that CP function(s) (e.g., AMF, SMF, etc.) may enforce the policy rule, and implementing a front end so that associated subscription information is accessed to determine a policy in a User Data Repository (UDR), or the like.

The SMF provides a session management function. When the UE has multiple sessions, each session may be managed by a different SMF.

Specifically, the SMF supports functions such as session management (e.g., establishing, modifying, and releasing of a session, including maintaining of a tunnel between the UPF and the AN), UE IP address allocation and management (optionally, including authentication), selection and control of the UPF, traffic steering configuration for routing traffic from the UPF to a proper destination, termination of an interface towards policy control functions, execution of a control part of a policy and QoS, lawful intercept (an SM event and an interface towards an L1 system), termination of an SM part of an NAS message, downlink data notification, an initiator of AN-specific SM information (transferred to the AN through N2 via the ANF), SSC mode determination of a session, a roaming function, or the like.

Some or all functions of the SMF may be supported within a single instance of one SMF.

The UDM stores user's subscription data, policy date, or the like. The UDM includes two parts, i.e., an application Front End (FE) and a User Data Repository (UDR).

The FE includes a UDM FE responsible for processing of location management, subscription management, and credential processing, and a PCF responsible for policy control. The UDR stores data required for functions provided by the UDM-FE and a policy profile required by the PCF. Data stored in the UDR includes policy data and user scription data including a subscription identification, a security credential, access and mobility-related subscription data, and session-related subscription data. The UDM-FE accesses subscription information stored in the UDR, and supports functions such as authentication credential processing, user identification handling, access authentication, registration/mobility management, subscription management, SMS management, or the like.

The UPF transfers to the UE a downlink PUD received from the DN via the (R)AN, and transfers to the DN an uplink PDU received from the UE via the (R)AN.

Specifically, the UPF supports functions such as an anchor point for intra/inter RAT mobility, an external PDU session point of an interconnect to a data network, packet routing and forwarding, a user plane portion for packet inspection and policy rule execution, lawful intercept, traffic usage amount report, an uplink classifier for supporting routing of a traffic flow to a data network, a branching point for supporting a multi-homed PDU session, QoS handling for a user plane (e.g., packet filtering, gating, uplink/downlink rate execution), uplink traffic verification (mapping between a Service Data Flow (SDF) and a QoS flow), transport level packet marking in uplink and downlink, downlink packet buffering, downlink data notification triggering, or the like. Some or all functions of the UDP may be supported within a single instance of one UPF.

The AF interworks with a 3GPP core network for service provision (e.g., application impacts on traffic routing, network capability exposure approaches, supporting of a function such as interworking with a policy framework for policy control).

The (R)AN collectively refers to a new radio access network supporting both evolved E-UTRA which is an evolved version of a 4G radio access technique and a New Radio (NR) (e.g., gNB) which is a new radio access technique.

The gNB supports functions such as functions for management radio resources (i.e., radio bearer control, radio administration control, connection mobility control, dynamic application of resources in uplink/downlink to a UE (i.e., scheduling)), Internet Protocol (IP) header compression, encryption and integrity protection of user data streams, when routing to an AMF is not determined from information provided to the UE, selecting of the AMF in UE attachment, user plane data routing to UPF(s), control plane information routing to the AMF, connection setup and release, scheduling and transmission of paging message (generated from the AMF), scheduling and transmission of system broadcast information (generated from the AMF or an Operating and Maintenance (O&M)), measurement for mobility and scheduling and measurement report configuration, transport level packet marking in uplink, session management, network slicing support, QoS flow management and data radio bear mapping, support of a UE in an inactive mode, NAS message distribution, NAS node selection, radio access network sharing, dual connectivity, tight interworking between the NR and the E-UTRA, or the like.

The UE means a user device. The user device may be referred to as terms such as a terminal, a Mobile Equipment (ME), a Mobile Station (MS), or the like. In addition, the user device may be a portable device such as a laptop, a mobile phone, a Personal Digital Assistant (PDA), a smartphone, a multimedia device, or the like, or may be a non-portable device such as a Personal Computer (PC), a vehicle-mounted device, or the like.

Although an Unstructured Data Storage network Function, (UDSF), a Structured Data Storage network Function (SDSF), a Network Exposure Function (NEF), and an NF Repository Function (NRF) are not shown in FIG. 1 for convenience of explanation, all NFs shown in FIG. 1 may optionally interwork with the UDSF, the NEF, and the NRF.

The NEF provides a means to securely expose services and capability provided by 3GPP network functions, for example, $3^{rd}$ party internal exposure/re-exposure, application functions, and edge computing. The NEF receives information from other network function(s) (based on exposed capability (or capabilities) of other network function(s)). The NEF may store the received information as structured data using a standardized interface towards a data repository network function. The stored information may be re-exposed to other network function(s) and application function(s) by means of the NEF, and may be used for other purposes such as analysis or the like.

The NRF supports a service discovery function. An NF discovery request is received from an NF instance, and information of the discovered NF instance is provided to the NF instance. In addition, available NF instances and services supported by the available NF instances are maintained.

The SDSF is an optional function for supporting an information repository and retrieval function as structured data by means of any NEF.

The UDSF is an optional function for supporting an information repository and retrieval function as non-structured data by means of any NF.

Meanwhile, although a reference model for a case where a UE accesses one DN by using one PDU session is exemplified for example in FIG. 1, the disclosure is not limited thereto.

The UE may simultaneously access two (i.e., local and central) data networks by using multiple PDU sessions. In this case, two SMFs may be selected for different PDU sessions. However, each SMF may have a capability of controlling both a local UPF and central UPF in the PDU session.

In addition, the UE may simultaneously access two (i.e., local and central) data networks provided in a single PDU session.

In the 3GPP system, a conceptual link connecting NFs in the 5G system is defined as a reference point. The reference point included in the 5G system architecture represented in FIG. 1 is exemplified as follows.

Figure 2:
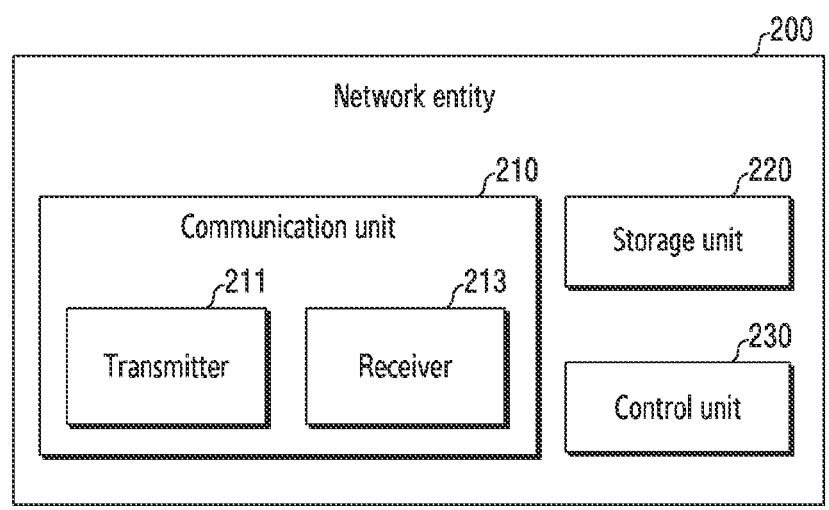
FIG. 2 illustrates a structure of a network entity in a wireless communication system according to various embodiments of the disclosure.

NG1: Reference point between UE and AMF
NG2: Reference point between (R)AN and AMF
NG3: Reference point between (R)AN and UPF
NG4: Reference point between SMF and UPF
NG5: Reference point between PCF and AF
NG6: Reference point between UPF and data network
NG7: Reference point between SMF and PCF
NG8: Reference point between UDM and AMF
NG9: Reference point between two core UPFs
NG10: Reference point between UDM and SMF
NG11: Reference point between AMF and SMF NG12: Reference point between AMF and AUSF
NG13: reference point between UDM and Authentication Server Function (AUSF)
NG14: Reference point between two AMFs
NG15: Reference point between PCF and AMF in case of non-roaming scenario, or reference point between PCF and AMF in a visited network in case of roaming scenario FIG. 2 illustrates a structure of a network entity in a wireless communication system according to various embodiments of the disclosure.

The network entity of the disclosure includes, in concept, a network function according to system implementation. Hereinafter, the term ' . . . unit', ' . . . device', or the like implies a unit of processing at least one function or operation, and may be implemented in hardware or software or in combination of the hardware and the software.

A network entity 200 according to various embodiments of the disclosure may include a communication unit 210, a storage unit 220, and a control unit 230 providing overall control to the network entity 200.

The communication unit 210 transmits and receives a signal with respect to other network entities. Accordingly, the entirety or part of the communication unit 210 may be referred to as a 'transmitter 211', a 'receiver 213', or a 'transceiver 210'.

The storage unit 220 stores data such as a basic program, application program, configuration information, or the like for an operation of the network entity 200. The storage unit 220 may be constructed of a volatile memory, a non-volatile memory, or a combination of the volatile memory and the non-volatile memory. In addition, the storage unit 220 provides the stored data according to a request of the control unit 230.

The control unit 230 provides overall control to the network entity 200. For example, the control unit 230 transmits and receives a signal via the communication unit 210. In addition, the control unit 230 writes data to the storage unit 220, and reads the data. Further, the control unit 230 may perform functions of a protocol stack required in a communication standard. To this end, the control unit 230 may include a circuit, an application-specific circuit, at least one processor or micro-processor, or may be part of the processor. In addition, part of the communication unit 210 and the control unit 230 may be referred to as a Communication Processor (CP). The control unit 230 may control the network entity 200 to perform any one operation in various embodiments of the disclosure.

The communication unit 210 and the control unit 230 are not necessarily implemented with separate modules, and may be implemented as a single chip or one component in the form of a software block. The communication unit 210, the storage unit 220, and the control unit 230 may be electrically coupled. In addition, operations of the network entity 200 may be realized by providing the storage unit 220 storing a corresponding program code in the network entity 200.

The network entity 200 includes network nodes, and may be any one of a base station (RAN), an AMF, an SMF, a UPF, an NF, an NEF, an NRF, a CF, an NSSF, a UDM, an AF, an AUSF, an SCP, a UDSF, a context storage, an OAM, an EMS, a configuration server, and an Identifier (ID) management server.

Various embodiments of the disclosure relate to a method of establishing a connection between system devices for creating an MBS session to provide an MBS service for each region and transferring MBS session-related data in the wireless communication system. Specifically, various embodiments of the disclosure relate to a method of determining an area in which an MBS service is provided and establishing an MBS session for transferring the MBS service in the area when a wireless communication system intends to provide the MBS service at the request of a content provider.

Figure 3:
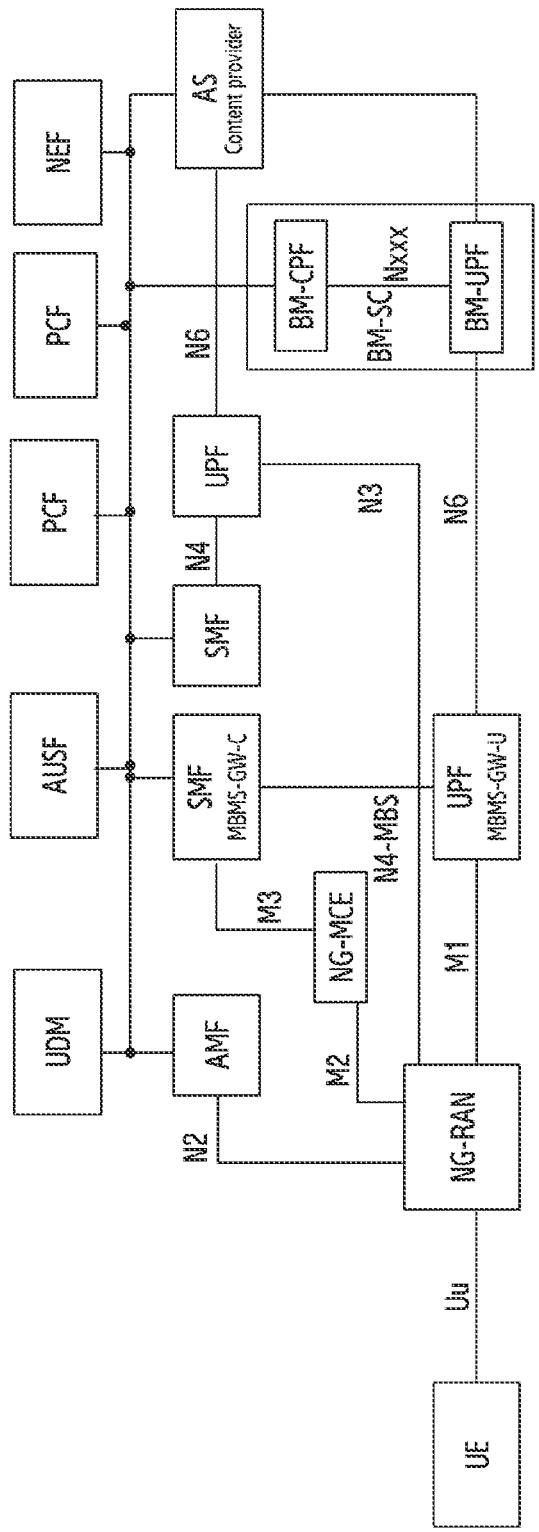
FIG. 3 illustrates an example of a structure of a system supporting a Multimedia Broadcast Service (MBS) service in a wireless communication system according to various embodiments of the disclosure.

FIG. 3 illustrates an example of a structure of a system supporting an MBS service in a wireless communication system according to various embodiments of the disclosure.

An Application Server (AS) may be an AS for providing a service such as Vehicle-to-Everything (V2X), Cellular Internet of Things (CIoT), Mission Critical Push to Talk (MCPTT), or the like, or may be an AS for providing content of content providers providing multimedia such as Television (TV), video, or the like. If an MBS service for data transmission is requested by the AS, the AS communicates with a Broadcast Multicast Service Center (BM-SC) which is an NF for managing an MBS service session and controlling traffic of the MBS service. In this case, the BM-SC may be configured by being divided into a Broadcast/Multicast-Control Plane Function (BM-CPF) for managing the MBS service session and a Broadcast/Multicast-Control Plane Function (BM-UPF) for processing and transmitting media traffic under the control of the BM-CPF, or functions of both of the BM-CPF and BM-UPF may be performed in one BM-SC. An interface between the BM-CPF and the BM-UPF is named an Nxxx interface. The BM-CPF and the BM-UPF may be configured by being integrated into one entity or one NF.

At the request of the AS, the BM-CPF may establish an MBS session for data transmission through a multicast/broadcast scheme for data transmission of the MBS service. Regarding the MBS session, when service traffic is transferred to a terminal through multicast/broadcast, the BM-CPF manages the traffic by allocating an MBS PDU session. A function or service for providing control to create MBS context for the MBS PDU session, manage the MBS PDU session, and transfer traffic of the MBS PDU session to a Next Generation Radio Access Network (NG-RAN) is collectively referred to as a Multimedia Broadcast-Multicast Service Gateway-Control Plane (MBMS-GW-C) service. The MBMS-GW-C service may be configured as an SMF having an MBS PDU session control function by being integrated into the existing SMF for managing a unicast PDU session, or may be configured as a separate NF. According to various embodiments of the disclosure, the NF configured separately with only the MBMS-GW-C service is called a Multicast/Broadcast Session Management Function (MB-SMF).

According to various embodiments of the disclosure, a service which transfers traffic, received from the BM-UPF in accordance with MBS context for the MBS PDU session, to an NG-RAN performing multicast/broadcast in accordance with the MBMS-GW-C service through an IP multicast is called a Multimedia Broadcast-Multicast Service Gateway-User plane (MBMS-GW-U) service. The MBMS-GW-U service may be configured as a UPF having a function of transferring MBS traffic to a proper NG-RAN through IP multicast by being integrated into the existing UPF for processing a unicast PDU session, or may be configured as a separate NF. In various embodiments of the disclosure, an NF configured separately with the MBMS-GW-U service is called a Multicast/Broadcast User Plane Function (MB-UPF).

The MBMS-GW-C service uses an N4-MBS interface for the control of the MBMS-GW-U service.

According to various embodiments of the disclosure, the MBMS-GW-C and the MBMS-GW-U are mainly described as the SMF and the UPF, respectively, for convenience. Optionally, however, whether a usage thereof is for unicast or for multicast/broadcast, or whether both multicast and broadcast are supported is described together to avoid confusion.

MBS PDU session data is transferred from the MBMS-GW-U (or the UPF or the MB-UPF) to the NG-RANs. In this case, a tunnel between the MBMS-GW-U (or the UPF or the MB-UPF) and the NG-RAN is called an M1 tunnel. To configure the M1 tunnel, the MBMS-GW-C (or the SMF) transmits a control message to the NG-RAN through a Next Generation-Multicell Coordination Entity (NG-MCE), or transmits the control message directly to the NG-RAN.

According to various embodiments of the disclosure, the NG-MCE may be configured to be separately detached as shown in FIG. 3, or may be configured to be included in the NG-RAN unlike in FIG. 3.

According to various embodiments of the disclosure, the BM-CPF and the MBMS-GW-C may not be configured separately, but may be configured to be integrated as one entity or NF. It is also possible to be configured by being integrated with another SMF.

According to various embodiments of the disclosure, the BM-UPF and the MBMS-GW-U may be configured by being integrated as one entity or one NF. In addition, the BM-UPF and the MBMS-GW-U may be configured by being integrated with another UPF.

Figure 4:
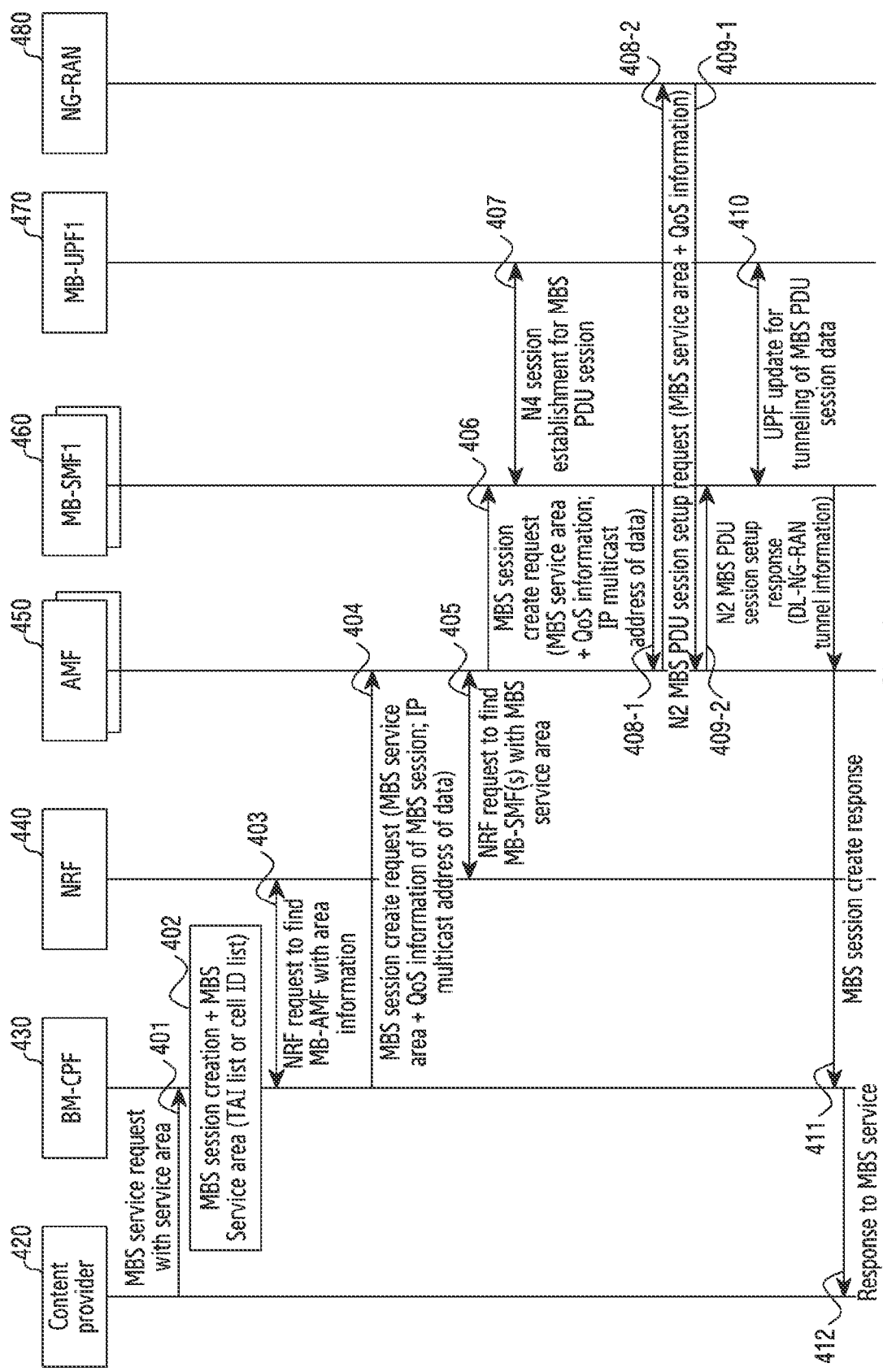
FIG. 4 illustrates a procedure of determining an MBS service area and establishing an MBS session in a wireless communication system according to various embodiments of the disclosure.

FIG. 4 illustrates a procedure of determining an MBS service area and establishing an MBS session in a wireless communication system according to various embodiments of the disclosure.

When a content provider 420 intends to provide an MBS service in a specific area, the content provider 420 may transmit an MBS service request to a Broadcast/Multicast Plane Function (BM-CPF) 430 (401). In this case, the MBS service request may include information on service content for providing the MBS service, a Quality of Service (QoS) requirement of the service, and a service area in which the service is to be provided. In this case, the information of the service area may include regional information indicating physical geographic information such as Global Positioning System (GPS) coordinates, logical geographic information which may be distinguished by an indicator defined in a mobile communication system, or the like.

Upon receiving the MBS service request from the content provider 420, the BM-CPF 430 may create an MBS session for supporting the MBS service request and define the MBS service area for providing an MBS session created based on the service area information included in the MBS service request (402). In this case, the BM-CPF 430 may include information such as a tracking area, cell ID, or the like corresponding to a region as the MBS service area. In addition, the BM-CPF 430 may determine a QoS requirement of the MBS session, based on service requirements included in the MBS service request received from the content provider 420.

According to various embodiments of the disclosure, the BM-CPF 430 may determine the QoS requirement of the MBS session from a service requirement of the MBS service requested through communication with a Policy Control Function (PCF) defined in the wireless communication system.

The BM-CPF 430 may request an NRF 440 for information of an AMF 450 responsible for the created MBS service area (403). In this case, the message requested from the BM-CPF 430 to the NRF 440 may include information of the MBS service area or some areas, information of the QoS requirement of the MBS session, or the like.

The NRF 440 may reply to the BM-CPF 430 with information of one or more AMFs 450 capable of supporting the area information received from the BM-CPF 430. According to various embodiments of the disclosure, when the MBS service area is indicated as a tracking area, the BM-CPF 430 may request the NRF 440 for the information of the AMF 450, including information of the tracking area. The NRF may reply to the BM-CPF 430 by including the received information of the AMFs 450 responsible for the tracking area and information of the tracking area in which each AMF 450 is capable of providing a service.

Upon receiving the information of the AMF 450 from the NRF 440, the BM-CPF 430 may select one or more AMFs 450 responsible for the MBS service area from among the AMFs 450, and may transmit an MBS session create request to the AMFs 450 (404). In this case, the MBS session create request message may include an MBS service area, a QoS requirement of an MBS session, an IP address of a service which transmits data of the MBS session, and a unicast IP address, multicast IP address, or the like indicating a recipient of MBS data transmitted from the server.

Upon receiving the MBS session create request, the AMF 450 selects an SMF 460 capable of supporting the MBS service in the MBS service area included in the received message. In this case, when there is information pre-configured in the AMF 450, the AMF 450 may select the SMF 460, based on the configuration information. In addition, the AMF 450 may request the NRF 440 for information of the SMF capable of supporting the MBS service in the MBS service area, including information of the MBS service area, information of a QoS requirement of the MBS session, or the like (405).

After receiving the request for the information from the AMF 450, the NRF 440 may reply to the AMF 450 with information of one or more SMFs 460.

The AMF 450 may select the SMF 460 capable of supporting the MBS session in the MBS service area included in the MBS session create request, based on information received from the NRF 440 or pre-configured information, and may transfer an MBS session create request to the SMF 460 (406).

Upon receiving the MBS session create request, the SMF 460 selects a UPF 470 capable of supporting the MBS session in the MBS service area, and establishes an N4 session for supporting an MBS PDU session in the UPF 470 (407). In this case, the SMF 460 may include an IP address of a server capable of indicating the MBS session and a unicast IP address, multicast IP address, or the like indicating a recipient of MBS data transmitted from the server. The SMF 460 may complete a procedure of establishing the N4 session for MBS session processing with the UPF 470, and may transfer to the AMF 450 an N2 MBS PDU session setup request so that a connection for MBS data transfer between the UPF 470 and base stations 480 is established to the base stations (NG-RANs) 480 (408-1).

After receiving the N2 MBS PDU session setup request, the AMF 450 transfers the N2 MBS PDU session setup request to the base stations 480 located in the MBS service area (408-2). When selecting the base stations 480 for transferring the N2 MBS PDU session setup request, the AMF 450 may select all of the base stations 480 having an N2 connection established with the AMF 450 in the MBS service area or select the base station 480 by reference to information of the base station supporting a pre-configured MBS.

Upon receiving the N2 MBS PDU session setup request, the base station 480 may configure a radio resource for transmitting MBS data, based on QoS information of an MBS session included in the N2 MBS PDU session setup request.

The base stations 480 may transfer an N2 MBS PDU session setup response to the AMF 450 in response to the N2 MBS PDU session setup request (409-1). The N2 MBS PDU session setup response may include whether the base station 480 supports an MBS function, a response to whether a resource for the MBS session is properly configured, recipient information of a tunnel for establishing an N3 connection with the UPF 470 for the MBS session, or the like.

The AMF 450 may receive the N2 MBS PDU session setup response, and may transfer it to the SMF 460 (409-2).

Upon receiving the N2 MBS PDU session setup response, when the base station 480 is capable of supporting the MBS session, the SMF 460 transfers to the UPF 470 recipient information of a tunnel for establishing an N3 connection of the base station 480 to report that the N3 connection with the base station 480 needs to be established for the MBS session (410).

Upon receiving the N2 MBS PDU session setup response from another base station for a corresponding MBS session, the SMF 460 may additionally report the recipient information of the tunnel for establishing the N3 connection of the base station 480, and the UPF 470 may be allowed to add the N3 connection with the base station for the MBS session.

According to various embodiments of the disclosure, the AMF 450 may collect the N2 MBS PDU session setup responses from the base stations 480 which have received the N2 MBS PDU session setup request, and may transfer the responses to the SMF 460 at a time.

Upon receiving the N2 MBS PDU session setup response, the SMF 460 may transmit an MBS session create response to report to the BM-CPF 430 that the MBS session is successfully created through the AMF 450 (411).

After receiving the MBS session create response, the BM-CPF 430 may reply to the content provider 420 that a connection for the MBS service has been successfully created and that it is possible to provide the MBS service (412).

According to various embodiments of the disclosure, the reply to the MBS service connection in the MB-CPF 430 may be transferred to the content provider 420 immediately after the MBS session is created in the BM-CPF 430.

According to various embodiments, the MBS session create response in the SMF 460 may be transferred to the AMF 450 after the N4 connection of the UPF 470 is established.

Figure 5:
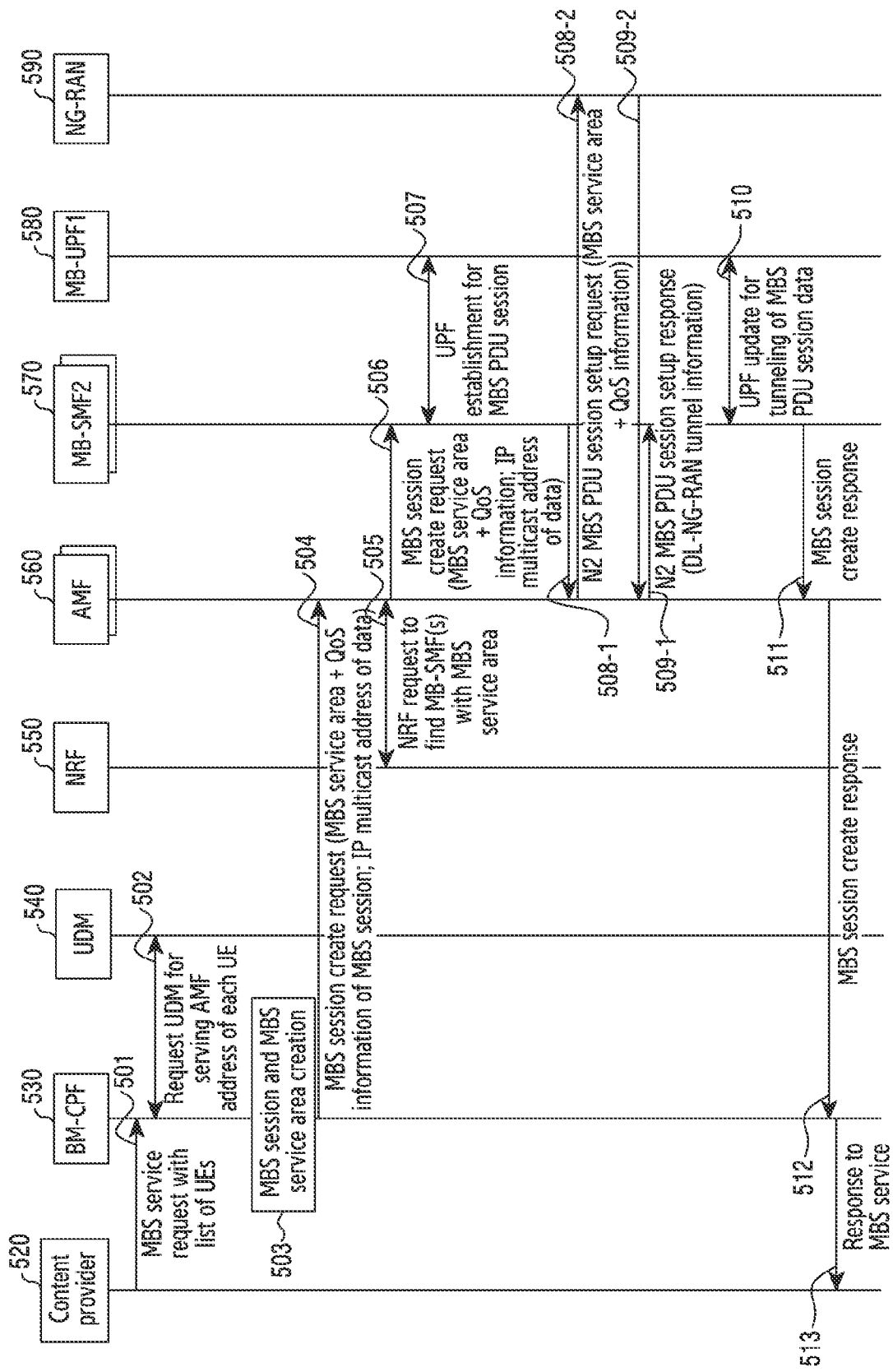
FIG. 5 illustrates a procedure of determining an MBS service area and establishing an MBS session, based on a terminal for receiving an MBS, in a wireless communication system according to various embodiments of the disclosure.

FIG. 5 illustrates a procedure of determining an MBS service area and establishing an MBS session, based on a UE for receiving an MBS, in a wireless communication system according to various embodiments of the disclosure.

When a content provider 520 intends to provide an MBS service in a specific area, the content provider 520 may transmit an MBS service request to a BM-CPF 530. In this case, the MBS service request may include UE ID information which may refer to UEs for providing the MBS service, UE group ID information which may refer to a group of UEs, and information on service content, a QoS requirement of the service, and a service area in which the service is to be provided. In this case, the information of the service area may include regional information indicating physical geographic information such as GPS coordinates, logical geographic information which may be distinguished by an indicator defined in a wireless communication system, or the like.

Upon receiving the MBS service request from the content provider 520, the BM-CPF 530 may create an MBS session for supporting the MBS service request and obtain information of an AMF in which each UE is registered to a UDM 540 by using UE information included in the MBS service request (502). In this case, the BM-CPF 530 may define an MBS service area by identifying a location of each UE and information of an AMF's service region obtained for each UE (503).

If the MBS service request received from the content provider 520 includes UE group ID information, including several UEs, the BM-CPF 530 may identify information of all UEs belonging to a corresponding group, and may obtain information of an AMF 560 in which each UE is registered to the UDM 540 by using information of a corresponding UE.

When the MBS service request includes a service area of an MBS service to be provided by the content provider 520 together, the BM-CPF 530 may determine the MBS service area as the provided service area by utilizing the provided service area or a location of a UE to which the service is to be provided or information of a service region of the AMF 560 together, or may determine the MBS service area by specifying the MBS service area to support all UEs or by specifying the MBS service area so that the MBS service is supported only for UEs belonging to a location of the service area.

In addition, the BM-CPF 530 may determine a QoS requirement of the MBS session, based on service requirements included in the MBS service request received from the content provider 520.

According to various embodiments of the disclosure, the BM-CPF 530 may determine the QoS requirement of the MBS session from a service requirement of the MBS service requested through communication with a Policy Control Function (PCF) defined in the wireless communication system.

The BM-CPF 530 may create an MBS session at the request of the content provider 520, and may determine the MBS service area. In addition, the BM-CPF 530 may select the AMFs 560 coupled to the UE and base stations of the MBS service area, and may transmit an MBS session create request to the selected AMFs 560 (504). In this case, the AMFs 560 may be selected from among serving AMFs 560 of the UE identified from the UDM 540, by using UE information included in the MBS request of the content provider 520.

In this case, the MBS session create request message may include an MBS service area, a QoS requirement of an MBS session, an IP address of a service which transmits data of the MBS session, and a unicast IP address, multicast IP address, or the like indicating a recipient of MBS data transmitted from the server.

Upon receiving the MBS session create request, the AMF 560 selects an SMF 570 capable of supporting the MBS service in the MBS service area included in the received message. In this case, when there is information pre-configured in the AMF 560, the AMF 560 may select the SMF 570, based on the configuration information. In addition, the AMF 560 may request an NRF 550 for information of the SMF 570 capable of supporting the MBS service in the MBS service area, including information of the MBS service area, information of a QoS requirement of the MBS session, or the like.

After receiving the request for the information from the AMF 560, the NRF 550 may reply to the AMF 560 with information of one or more SMFs 570 (505).

The AMF 560 may select the SMF 570 capable of supporting the MBS session in the MBS service area included in the MBS session create request, based on information received from the NRF 550 or pre-configured information, and may transfer an MBS session create request to the SMF 570 (506).

Upon receiving the MBS session create request, the SMF 570 selects a UPF 580 capable of supporting the MBS session in the MBS service area, and establishes an N4 session for supporting an MBS PDU session in the UPF 580. In this case, the SMF 570 may include an IP address of a server capable of indicating the MBS session and a unicast IP address, multicast IP address, or the like indicating a recipient of MBS data transmitted from the server. The SMF 570 may complete a procedure of establishing the N4 session for MBS session processing with the UPF 580, and may transfer to the AMF 560 an N2 MBS PDU session setup request so that a connection for MBS data transfer between the UPF 580 and base stations 590 is established to the base stations 590.

The AMF 560 receives the N2 MBS PDU session setup request (508-1). Thereafter, the AMF 560 transfers the N2 MBS PDU session setup request to the base stations 590 located in the MBS service area (508-2). When selecting the base stations 590 for transferring the N2 MBS PDU session setup request, the AMF 560 may select all of the base stations 590 having an N2 connection established with the AMF 560 in the MBS service area or select the base station 590 by reference to information of the base station 590 supporting a pre-configured MBS.

Upon receiving the N2 MBS PDU session setup request, the base station 590 may configure a radio resource for transmitting MBS data, based on QoS information of an MBS session included in the N2 MBS PDU session setup request.

The base stations 590 may transfer an N2 MBS PDU session setup response to the AMF 560 in response to the N2 MBS PDU session setup request (509-1). The N2 MBS PDU session setup response may include whether the base station 590 supports an MBS function, a response to whether a resource for the MBS session is properly configured, recipient information of a tunnel for establishing an N3 connection with the UPF for the MBS session, or the like.

The AMF 560 may receive the N2 MBS PDU session setup response, and may transfer it to the SMF 570 (509-2).

Upon receiving the N2 MBS PDU session setup response, when the base station 590 is capable of supporting the MBS session, the SMF 570 transfers to the UPF 580 recipient information of a tunnel for establishing an N3 connection of the base station 590 to report that the N3 connection with the base station 590 needs to be established for the MBS session.

Upon receiving the N2 MBS PDU session setup response from another base station for a corresponding MBS session, the SMF 570 may additionally report the recipient information of the tunnel for establishing the N3 connection of the base station 590, and the UPF 580 may be allowed to add the N3 connection with the base station 590 for the MBS session.

According to various embodiments of the disclosure, the AMF 560 may collect the N2 MBS PDU session setup responses from the base stations 590 which have received the N2 MBS PDU session setup request, and may transfer the responses to the SMF 570 at a time.

Upon receiving the N2 MBS PDU session setup response, the SMF 570 may transmit an MBS session create response to report to the BM-CPF 530 that the MBS session is successfully created through the AMF 560 (511, 512).

After receiving the MBS session create response, the BM-CPF 530 may reply to the content provider 520 that a connection for the MBS service has been successfully created and that it is possible to provide the MBS service (513).

According to various embodiments of the disclosure, the reply to the MBS service connection in the MB-CPF 530 may be transferred to the content provider 520 immediately after the MBS session is created in the BM-CPF 530.

According to various embodiments, the MBS session create response in the SMF 570 may be transferred to the AMF 560 after the N4 connection of the UPF 580 is established.

Figure 6:
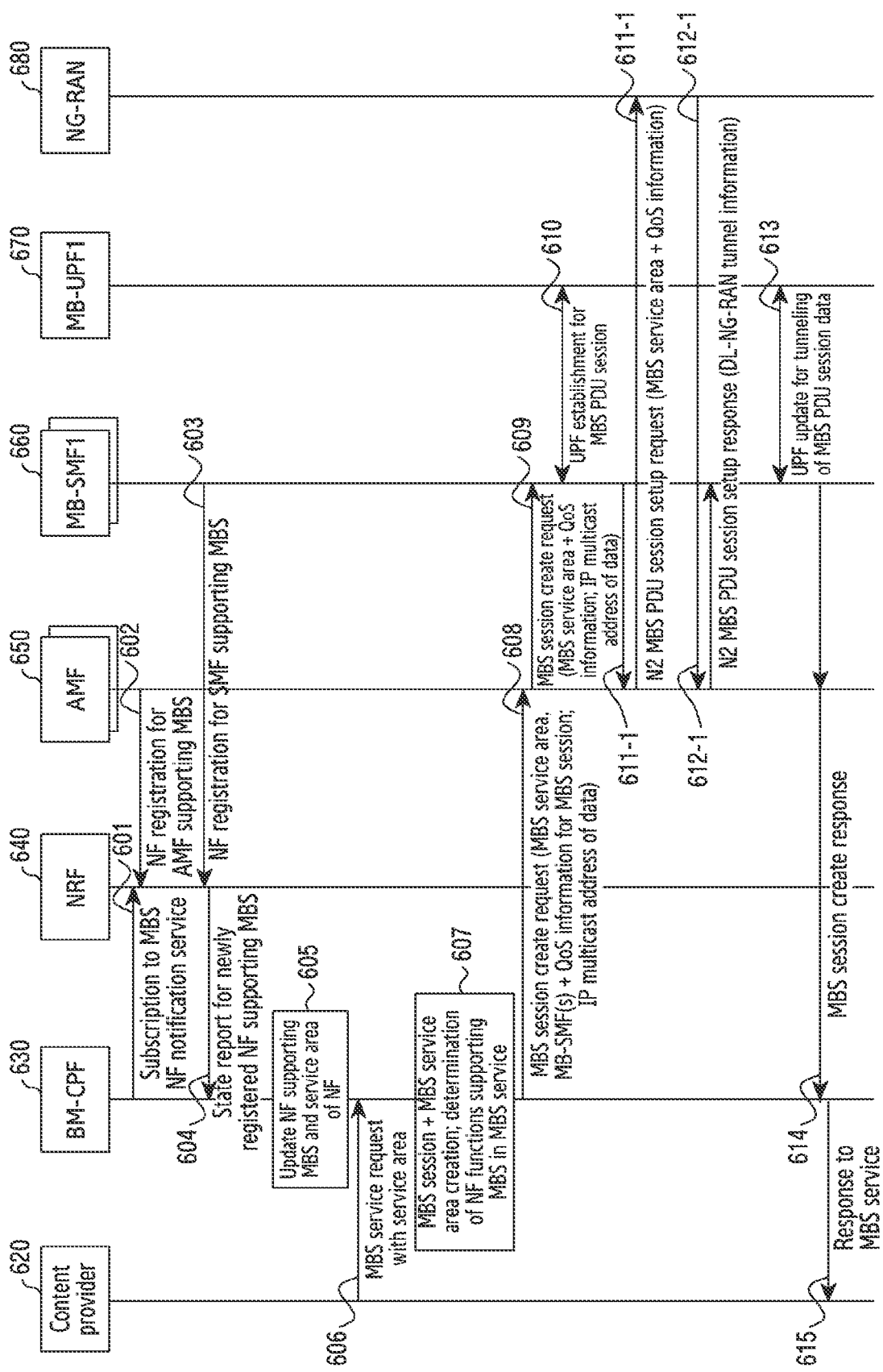
FIG. 6 illustrates a procedure of establishing an MBS session, based on pre-configured NF information, in a wireless communication system according to various embodiments of the disclosure.

FIG. 6 illustrates a procedure of establishing an MBS session, based on pre-configured NF information, in a wireless communication system according to various embodiments of the disclosure.

A BM-CPF 630 requests an NRF 640 for information of an AMF 650 supporting an MBS service or information of an SMF 660 (601). The BM-CPF 630 may subscribe to a notification service of the NRF 640 so as to be notified of updated information of the AMF 650 or SMF 660 when the information of the AMF 650 is updated or the information of the SMF 660 is updated. In this case, the BM-CPF 630 may request the NRF 650 to report the information by including additional information such as a service area, location, or the like of the AMF 650 or SNF 660.

When the information of the AMF 650 or SMF 660 supporting the MBS service is updated or the new AMF 650 or SMF 660 is registered to the NRF 640 (602, 603), the NRF 640 may report this to the BM-CPF 630 which has subscribed to the notification service (604). In this case, the information reported from the BM-CPF 630 to the NRF 640 may include additional information such as a service area, location, or the like of the AMF 650 or SNF 660.

Upon receiving the information of the AMF 650 or SMF 660 supporting the MBS service from the NRF 640, the BM-CPF 630 may organize and manage an MBS service available region and information of the AMF 650 or SMF 660 in that region, based on the received information (605).

When the content provider 620 intends to provide an MBS service in a specific area, the content provider 620 may transmit an MBS service request to the BM-CPF 630 (606). In this case, the MBS service request may include information on service content for providing the MBS service, a QoS requirement of the service, and a service area in which the service is to be provided. In this case, the information of the service area may include regional information indicating physical geographic information such as GPS coordinates, logical geographic information which may be distinguished by an indicator defined in a mobile communication system, or the like.

Upon receiving the MBS service request from the content provider 620, the BM-CPF 630 may create an MBS session for supporting the MBS service request and define the MBS service area for providing an MBS session created based on the service area information included in the MBS service request (607). In this case, the BM-CPF 630 may include information such as a tracking area, cell ID, or the like corresponding to a region as the MBS service area. In addition, the BM-CPF 630 may determine a QoS requirement of the MBS session, based on service requirements included in the MBS service request received from the content provider 620.

According to various embodiments of the disclosure, the BM-CPF 630 may determine the QoS requirement of the MBS session from a service requirement of the MBS service requested through communication with a Policy Control Function (PCF) defined in the wireless communication system.

The BM-CPF 630 may select the AMF 650 or SMFs 660 to be included in the MBS session in the MBS service area by using an MBS service available region which has been managed in advance and information of the AMF 650 and SMF 660 capable of providing a service in the region.

The BM-CPF 630 may transmit an MBS session create request to the selected AMFs 650 (608). In this case, the MBS session create request message may include an MBS service area, a QoS requirement of an MBS session, an IP address of a service which transmits data of the MBS session, and a unicast IP address, multicast IP address, or the like indicating a recipient of MBS data transmitted from the server. According to various embodiments of the disclosure, information of an SMF for participating in the MBS session in the MBS service area may also be included.

Upon receiving the MBS session create request, the AMF 650 selects the SMF 660 capable of supporting the MBS service in the MBS service area included in the received message. In this case, when there is information pre-configured in the AMF 650, the AMF 650 may select the SMF 660, based on the configuration information. In addition, when information of the SMF 660 is included in the MBS session create request received from the BM-CPF 630, the SMF 660 may be selected based on this. In addition, the AMF 650 may request the NRF 640 for information of the SMF capable of supporting the MBS service in the MBS service area, including information of the MBS service area, information of a QoS requirement of the MBS session, or the like. After receiving the request for the information from the AMF 650, the NRF 640 may reply to the AMF 650 with information of one or more SMFs 660.

The AMF 650 may select the SMF 660 capable of supporting the MBS session in the MBS service area included in the MBS session create request, and may transfer an MBS session create request to the SMF 660 (609).

Upon receiving the MBS session create request, the SMF 660 selects a UPF 670 capable of supporting the MBS session in the MBS service area, and establishes an N4 session for supporting an MBS PDU session in the UPF 670 (610). In this case, the SMF 660 may include an IP address of a server capable of indicating the MBS session and a unicast IP address, multicast IP address, or the like indicating a recipient of MBS data transmitted from the server. The SMF 660 may complete a procedure of establishing the N4 session for MBS session processing with the UPF 670, and may transfer to the AMF 650 an N2 MBS PDU session setup request so that a connection for MBS data transfer between the UPF 670 and base stations 680 is established to the base stations (611-1).

After receiving the N2 MBS PDU session setup request, the AMF 650 transfers the N2 MBS PDU session setup request to the base stations 680 located in the MBS service area (611-2). When selecting the base stations 680 for transferring the N2 MBS PDU session setup request, the AMF 650 may select all of the base stations 680 having an N2 connection established with the AMF 650 in the MBS service area or select the base station 680 by reference to information of the base station 680 supporting a pre-configured MBS.

Upon receiving the N2 MBS PDU session setup request, the base station 680 may configure a radio resource for transmitting MBS data, based on QoS information of an MBS session included in the N2 MBS PDU session setup request.

The base stations 680 may transfer an N2 MBS PDU session setup response to the AMF 650 in response to the N2 MBS PDU session setup request (612-1). The N2 MBS PDU session setup response may include whether the base station 680 supports an MBS function, a response to whether a resource for the MBS session is properly configured, recipient information of a tunnel for establishing an N3 connection with the UPF for the MBS session, or the like.

The AMF 650 may receive the N2 MBS PDU session setup response, and may transfer it to the SMF 660 (612-2).

Upon receiving the N2 MBS PDU session setup response, when the base station 680 is capable of supporting the MBS session, the SMF 660 transfers to the UPF 670 recipient information of a tunnel for establishing an N3 connection of the base station 680 to report that the N3 connection with the base station 680 needs to be established for the MBS session (613).

Upon receiving the N2 MBS PDU session setup response from another base station for a corresponding MBS session, the SMF 660 may additionally report the recipient information of the tunnel for establishing the N3 connection of the base station 680, and the UPF 670 may be allowed to add the N3 connection with the base station 680 for the MBS session.

According to various embodiments of the disclosure, the AMF 650 may collect the N2 MBS PDU session setup responses from the base stations 680 which have received the N2 MBS PDU session setup request, and may transfer the responses to the SMF 660 at a time.

Upon receiving the N2 MBS PDU session setup response, the SMF 660 may transmit an N2 MBS PDU session create response to report to the BM-CPF 630 that the MBS session is successfully created through the AMF 650 (614).

After receiving the N2 MBS PDU session create response, the BM-CPF 630 may reply to the content provider 620 that a connection for the MBS service has been successfully created and that it is possible to provide the MBS service (615).

According to various embodiments of the disclosure, the reply to the MBS service connection in the MB-CPF 630 may be transferred to the content provider 620 immediately after the MBS session is created in the BM-CPF 630.

According to various embodiments, the MBS PDU session setup response in the SMF 660 may be transferred to the AMF 650 after the N4 connection of the UPF is established.

Figure 7:
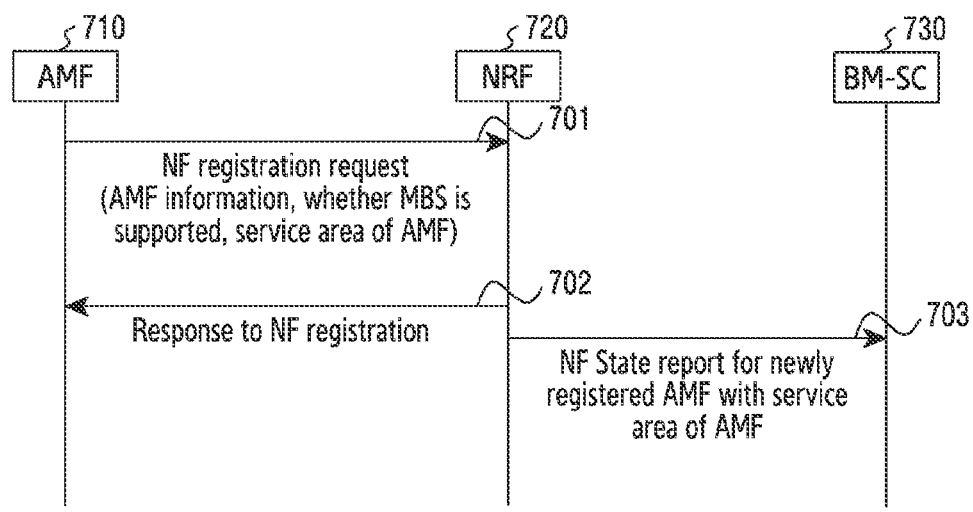
FIG. 7 illustrates a procedure of registering information of an Access and mobility Management Function (AMF) supporting an MBS service to a network and reporting this to a Network Functions (NF) managing the MBS service in a wireless communication system according to various embodiments of the disclosure.

FIG. 7 illustrates a procedure of registering information of an AMF supporting an MBS service to a network and reporting this to an NF managing the MBS service in a wireless communication system according to various embodiments of the disclosure.

An AMF 710 may be registered to an NRF 720 so that other NFs are able to find the AMF 710 (701). In this case, the AMF 710 may include whether the MBS service is supported, information indicating an area, such as a tracking area or the like, in which the AMF 701 is capable of managing a UE, ID-related information of the AMF 710, information of a network slice to which the AMF 710 belongs, or the like.

Upon receiving a registration request from the AMF 710, the NRF 720 may register corresponding information and reply to the AMF 710 that the information has been successfully registered (702).

In addition, when the AMF 710 is updated or when a new AMF is registered, the NRF 720 may notify NFs requested in advance for a notification of the update or the registration, among other NFs including the BM-CPF 730, the NEF, or the SMF, of information of the corresponding AMF (703). In this case, additional information capable of reporting a service area of the AMF 710 or a location of the AMF 710 may be included in the notification of the NRF 720.

Figure 8:
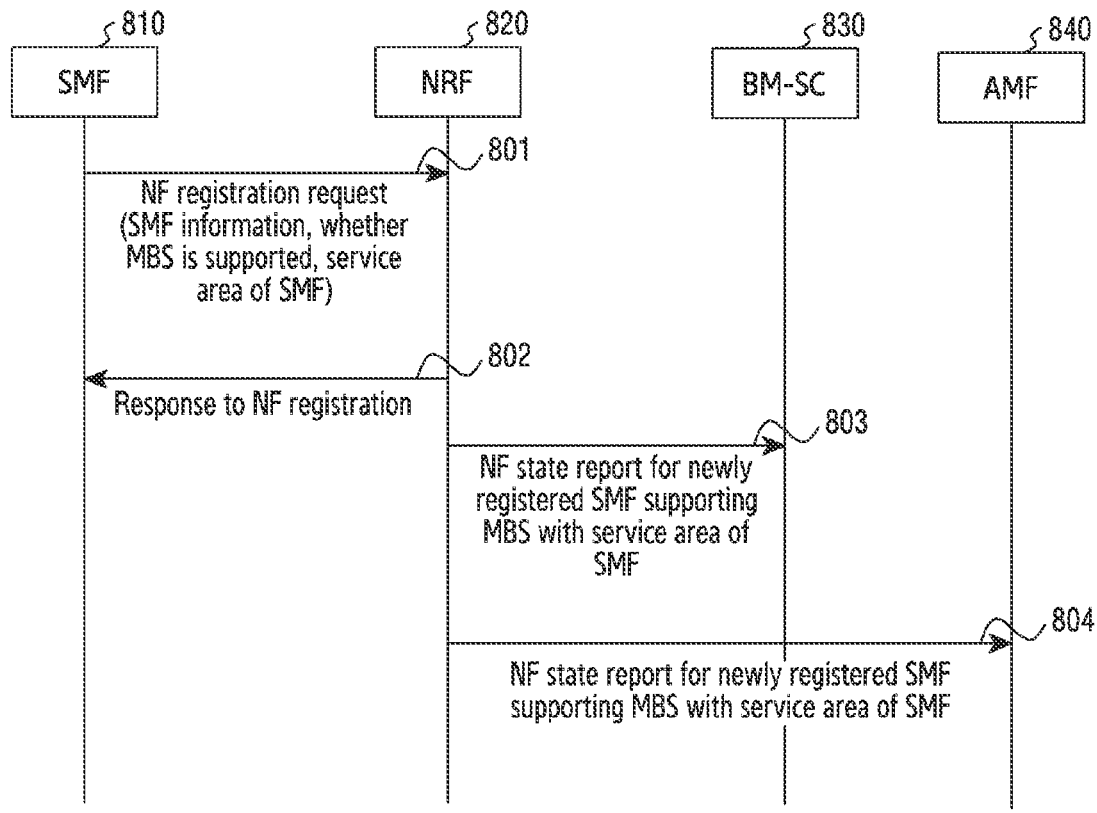
FIG. 8 illustrates a procedure of registering information of an SMF supporting an MBS service to a network and reporting this to an NF managing the MBS service in a wireless communication system according to various embodiments of the disclosure.

FIG. 8 illustrates a procedure of registering information of an SMF supporting an MBS service to a network and reporting this to an NF managing the MBS service in a wireless communication system according to various embodiments of the disclosure.

An SMF 810 may be registered to an NRF 820 so that other NFs are able to find the SMF 810 (801). In this case, the SMF 810 may include whether the MBS service is supported, a service area in which the SMF 810 is capable of supporting the service, information of a Data Network Name (DNN) or the like related to a PDU session supported by the SMF 810, ID-related information of the SMF 810, information of a network slice to which the SMF 810 belongs, or the like.

Upon receiving a registration request from the SMF 810, the NRF 820 may register corresponding information and reply to the SMF 810 that the information has been successfully registered (802).

In addition, when the SMF 810 is updated or a new SMF 810 is registered, NFs requested in advance for a notification of the update and the registration, among other NFs including the BM-CPF 830, the AMF 840, the NEF, or the SMF, may be notified of information of the SMF 810 (803, 804). In this case, additional information capable of reporting a service area of the SMF 810 or a location of the SMF 810 may be included in the notification of the NRF 820.

Figure 9:
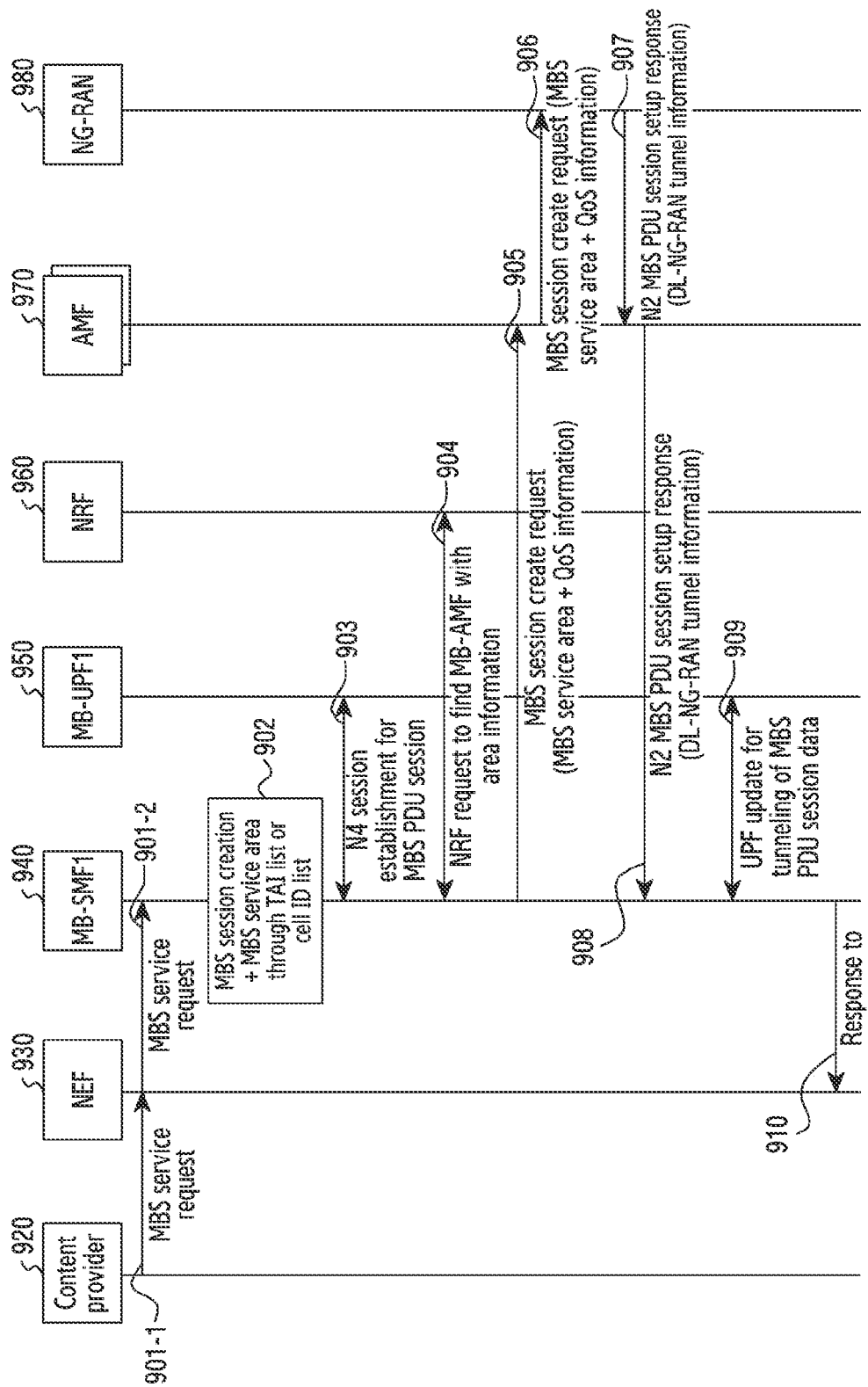
FIG. 9 illustrates a procedure of establishing an MBS session in a wireless communication system according to various embodiments of the disclosure.

FIG. 9 illustrates a procedure of establishing an MBS session in a wireless communication system according to various embodiments of the disclosure.

According to various embodiments of the disclosure, a case where an MB-CPF is included as a function of an SMF is assumed, and a procedure in which an SMF 940 determines an MBS service area and establishes an MBS session is provided.

When a content provider 920 intends to provide the MBS service in a specific area, the content provider 902 may transmit an MBS service request to the wireless communication system (901-1). In this case, a connection between the content provider 920 and the wireless communication system device may be established through an NEF 930 provided for connection between the wireless communication system and the outside.

The MBS service request from the content provider 920 may include information on service content for providing the MBS service, a QoS requirement of the service, and a service area in which the service is to be provided. In this case, the information of the service area may include regional information indicating physical geographic information such as GPS coordinates, logical geographic information which may be distinguished by an indicator defined in a wireless communication system, or the like.

Upon receiving the MBS service request from the content provider 902, the NEF 930 may select the SMF 940 which provides the MBS service by utilizing information of a UE or service area information included in the MBS service request.

If the MBS service request includes the service region information, the NEF 930 may request an NRF 960 to provide information of the SMF 940 which provides the MBS service in a corresponding region by utilizing the service region information, and may select the SMF 940, based on the information obtained from the NRF 960.

If the MBS service request includes the information of the UE, the MEF 930 may obtain locations of the UEs or information of a serving AMF 970 of the UE, may request the NRF 960 to provide information of the SMF 940 which provides the MBS service, including the service area, based on the obtained information, and may select the SMF 940, based on the information obtained from the NRF 960.

In addition, the NEF 930 may select the SMF 940 configured to process a pre-configured MBS service request.

The NEF 930 may transfer to the selected SMF 940 the MBS service request received from the content provider 920 (901-2).

Upon receiving the MBS service request through the NEF 930, the SMF 940 may create an MBS session for supporting the MBS service request and define the MBS service area for providing an MBS session created based on the service area information included in the MBS service request (902). In this case, the BM-CPF may include information such as a tracking area, cell ID, or the like corresponding to a region as the MBS service area. In addition, the BM-CPF may determine a QoS requirement of the MBS session, based on service requirements included in the MBS service request received from the content provider.

According to various embodiments of the disclosure, the SMF 940 may determine the QoS requirement of the MBS session from a service requirement of the MBS service requested through communication with a Policy Control Function (PCF) defined in the wireless communication system.

Upon creating the MBS session and determining the MBS service area, the SMF 940 selects a UPF 950 capable of supporting the MBS session in the MBS service area, and establishes an N4 session for supporting an MBS PDU session in the UPF 950 (903). In this case, the SMF 940 may include an IP address of a server capable of indicating the MBS session and a unicast IP address, multicast IP address, or the like indicating a recipient of MBS data transmitted from the server. The SMF 940 may complete a procedure of establishing the N4 session for MBS session processing with the UPF 950, and may transfer to the AMF 970 an N2 MBS PDU session setup request so that a connection for MBS data transfer between the UPF 950 and base stations 980 is established to the base stations 980.

In order to transfer an N2 MBS PDU session setup request, the SMF 940 selects the AMF 970 for connection with the base stations 980 in a corresponding region. The SMF 940 may select a pre-configured AMF 970, based on pre-configured information, and may request the NRF 960 for information of the AMF 970 required for connection with the base stations 980 in a corresponding region (904).

In this case, the SMF 940 may request the NRF 960 for information of the AMF 970, including information of the created MBS service area. The NRF 960 may reply to the SMF 940 with information of one or more AMFs 970 capable of supporting the area information received from the SMF 940. According to various embodiments of the disclosure, when the MBS service area is indicated as a tracking area, the SMF 940 may request the NRF 960 for the information of the AMF 970, including information of the tracking area. The NRF 960 may reply to the SMF 940 by including the received information of the AMFs 970 responsible for the tracking area and information of the tracking area in which each AMF 970 is capable of providing a service.

Upon receiving the information of the AMF 970 from the NRF 960, the SMF 940 may select one or more AMFs 970 responsible for the MBS service area from among the AMFs 970, and may transmit an N2 MBS PDU session setup request to the AMFs 970 (905).

After receiving the N2 MBS PDU session setup request, the AMF 970 transfers the N2 MBS PDU session setup request to the base stations 980 located in the MBS service area (906). When selecting the base stations 980 for transferring the N2 MBS PDU session setup request, the AMF 970 may select all of the base stations 980 having an N2 connection established with the AMF 970 in the MBS service area or select the base station 980 by reference to information of the base station 980 supporting a pre-configured MBC.

Upon receiving the N2 MBS PDU session setup request, the base station 980 may configure a radio resource for transmitting MBS data, based on QoS information of an MBS session included in the N2 MBS PDU session setup request.

The base stations 980 may transfer an N2 MBS PDU session setup response to the AMF 970 in response to the N2 MBS PDU session setup request (907). The N2 MBS PDU session setup response may include whether the base station 980 supports an MBS function, a response to whether a resource for the MBS session is properly configured, recipient information of a tunnel for establishing an N3 connection with the UPF 950 for the MBS session, or the like.

The AMF 970 may receive the N2 MBS PDU session setup response, and may transfer it to the SMF 940 (908).

Upon receiving the N2 MBS PDU session setup response, when the base station 980 is capable of supporting the MBS session, the SMF 940 transfers to the UPF 950 recipient information of a tunnel for establishing an N3 connection of the base station 980 to report that the N3 connection with the base station 980 needs to be established for the MBS session (909).

Upon receiving the N2 MBS PDU session setup response from another base station for a corresponding MBS session, the SMF 940 may additionally report recipient information of a tunnel for establishing the N3 connection of the base station, and the UPF 950 may be allowed to add the N3 connection with the base station for the MBS session.

According to various embodiments of the disclosure, the AMF 970 may collect the N2 MBS PDU session setup responses from the base stations 980 which have received the N2 MBS PDU session setup request, and may transfer the responses to the SMF 940 at a time.

Upon receiving the N2 MBS PDU session setup response, the SMF 940 may reply to the content provider 920 that a connection for the MBS service has been successfully created through the NEF 930 and that it is possible to provide the MBS service (910).

According to various embodiments of the disclosure, the reply to the MBS service connection in the SMF 940 may be transferred to the content provider 920 immediately after establishing of the MBS session-related connection with the UPF 950 is complete.

Figure 10:
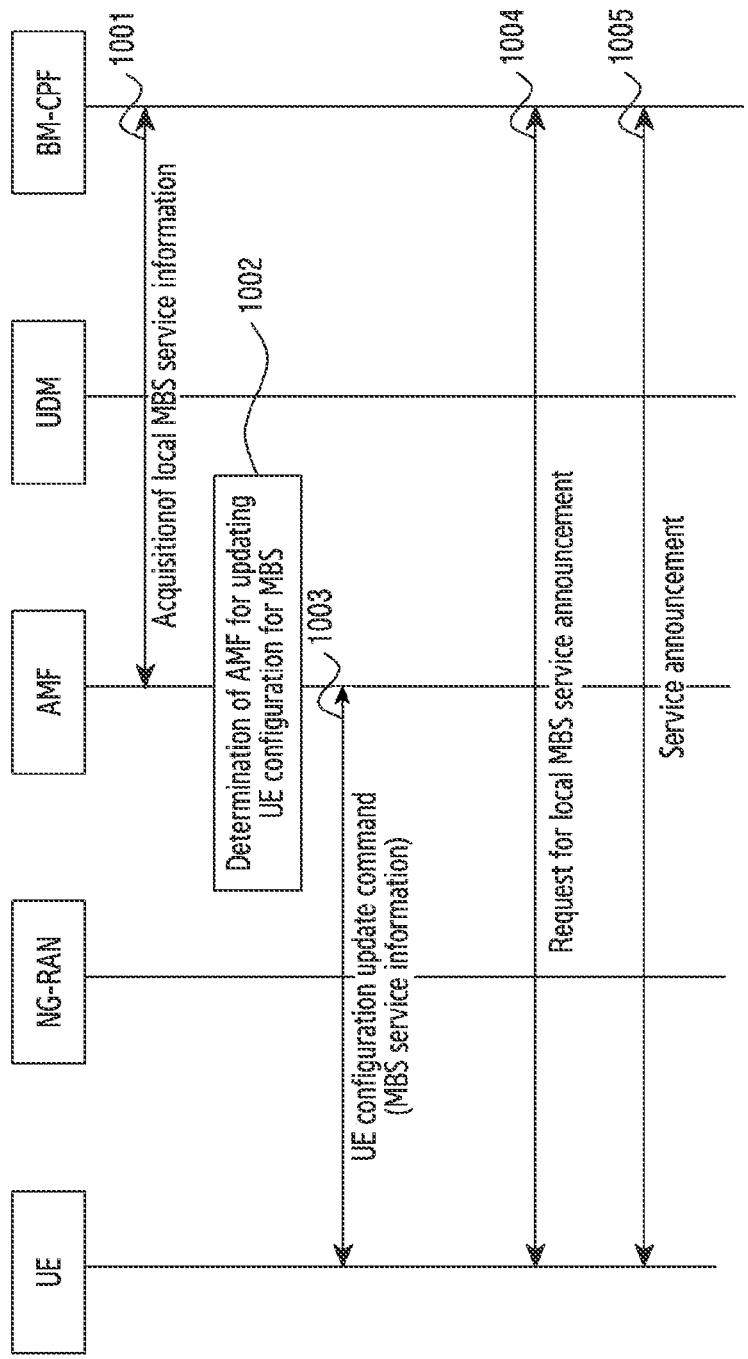
FIG. 10 illustrates a procedure of transferring newly configured or updated MBS-related information to a terminal in a wireless communication system according to various embodiments of the disclosure.

FIG. 10 illustrates a procedure of transferring newly configured or updated MBS-related information to a UE in a wireless communication system according to various embodiments of the disclosure.

After an MBS session is established, the BM-CPF 1050 may transfer MBS service-related information to AMFs 1030 of a corresponding MBS service area (1001). In this case, the MBS service-related information may include an address (including a type such as an IP address or Fully Qualified Domain Names (FQDN)) of a service capable of obtaining a service announcement, or when the service announcement is transmitted with data of another MBS service, MBS service-related reception information capable of receiving the service announcement, or information capable of receiving the service announcement in other manners. The MBS service-related information may include service area information reporting that the MBS service is available only in a specific area or an area managed by the AMF 1030 currently coupled to a UE 1010. In addition, the MBS service-related information may include not only information of an MBS service which is receivable only in a region managed by the AMF 1030 but also MBS service reception-related information in a neighboring AMF region required to receive MBS service data in a corresponding AMF region when handed over to another AMF region due to a movement of the UE 1010. The MBS service-related information may include not only information of an MBS service to which the UE 1010 is subscribed but also information of another MBS service available in the region.

Upon receiving the MBS service-related information from the BM-CPF 1050, the AMF 1030 selects the UEs 1010 which needs to update the information (1002). Thereafter, the AMF 1030 may transmit a UE configuration update command to the UEs 1010 (1003). In this case, MBS service-related information may be included in the UE configuration update command.

When the MBS service-related information is included in the UE configuration update command received from the AMF, the UE 1010 may receive the MBS service by utilizing the information, or may obtain a service announcement required to receive the MBS service (1004, 1005). In this case, when the MBS service-related information includes an address of a server including a service announcement, the UE 1010 may access the server to obtain service announcement information. According to various embodiments of the disclosure, the service announcement may be received in such a manner that the UE 1010 obtains information of another MBS service for transmitting a service announcement from the MBS service-related information and utilizes this to receive corresponding MBS service data.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

INDUSTRIAL APPLICABILITY

The disclosure relates, in general, to a wireless communication system, and in particular, to an apparatus and method for establishing a Multimedia Broadcast Service (MBS) service session for MBS service provision in the wireless communication system.

The invention claimed is:

1. A method performed by a session management function (SMF) entity supporting a multimedia broadcast service (MBS) in a wireless communication system, the method comprising:
receiving, from a network exposure function (NEF) entity, an MBS request message including information on an MBS service area for an MBS session, wherein the information on the MBS service area includes a list of tracking area identifiers (IDs);
discovering, using a network repository function (NRF) entity, at least one access and mobility management function (AMF) entity supporting the MBS based on the tracking area IDs related to the MBS service area;
transmitting, to the at least one AMF entity, an MBS session request message including the information on the MBS service area for the MBS session and information on a quality of service (QOS) of the MBS session;
receiving, from the at least one AMF entity, an MBS session response message, wherein the MBS session response message includes a success response indicating a successful establishment of MBS session resources for the base station in the MBS service area and tunnel information of the base station associated with a user plane function (UPF) entity for the MBS session; and
transmitting, to the UPF entity, an MBS session update message including the tunnel information for allocating a transport tunnel for the MBS session.

2. The method of claim 1, wherein the information on the MBS service area further includes a list of cell IDs or geographical area information.

3. The method of claim 1, wherein the MBS session request message is transmitted to all base stations which support the MBS in the MBS service area.

4. The method of claim 1, wherein the MBS session is established based on the QoS of the MBS session.

5. The method of claim 1, further comprising:
selecting the UPF entity supporting the MBS service; and
transmitting, to the UPF entity, information on internet protocol (IP) address associated with the MBS.

6. An access and mobility management function (AMF) entity supporting a multimedia broadcast service (MBS) in a wireless communication system, the method comprising:
receiving, from a session management function (SMF) entity, an MBS session request message including information on an MBS service area for an MBS session and information on a quality of service (QOS) of the MBS session, wherein the information on the MBS service area includes a list of tracking area identifiers (IDs);
transmitting, to a base station in the MBS service area, an N2 MBS session setup request message including the information on the MBS service area;
receiving, from the base station, an N2 MBS session setup response message including information reporting a successful establishment of MBS session resources for the base station and tunnel information of the base station associated with a user plane function (UPF) entity for the MBS session; and
transmitting, to the SMF entity, an MBS session response message, wherein the MBS session response message includes a success response indicating the successful establishment of MBS session resources for the base station in the MBS service area and the tunnel information for allocating a transport tunnel for the MBS session.

7. The method of claim 6, wherein the AMF entity supports the MBS based on the MBS service area in which the MBS session is provided.

8. The method of claim 6, wherein the information on the MBS service area further includes a list of cell IDs or geographical area information.

9. The method of claim 6, wherein the N2 MBS session setup request message further includes the information on the QoS of the MBS session.

10. The method of claim 6, wherein the MBS session is established based on the QoS of the MBS session.

11. A session management function (SMF) entity supporting a multimedia broadcast service (MBS) in a wireless communication system, the SMF entity comprising:
a transceiver; and
a controller coupled with the transceiver, and configured to:
receive, from a network exposure function (NEF) entity, an MBS request message including information on an MBS service area for an MBS session, wherein the information on the MBS service area includes a list of tracking area identifiers (IDs), discover, using a network repository function (NRF) entity, at least one access and mobility management function (AMF) entity supporting the MBS based on the tracking area IDs related to the MBS service area, transmit, to the at least one AMF entity, an MBS session request message including the information on the MBS service area for the MBS session and information on a quality of service (QOS) of the MBS session, receive, from the at least one AMF entity, an MBS session setup response message, wherein the MBS session response message includes a success response indicating a successful establishment of MBS session resources for the base station in the MBS service area and tunnel information of the base station associated with a user plane function (UPF) entity for the MBS session, and transmit, to the UPF entity, an MBS session update message including the tunnel information for allocating a transport tunnel for the MBS session.

12. The SMF entity of claim 11, wherein the information on the MBS service area further includes a list of cell IDs or geographical area information.

13. The SMF entity of claim 11, wherein the MBS session request message is transmitted to all base stations which support the MBS in the MBS service area.

14. The SMF entity of claim 11, wherein the MBS session is established based on the QoS requirement of the MBS session.

15. The SMF entity of claim 11, wherein the at least one processor is further configured to:

select the UPF entity supporting the MBS service; and transmit, to the UPF entity, information on internet protocol (IP) address associated with the MBS.

16. An access and mobility management function (AMF) entity supporting a multimedia broadcast service (MBS) in a wireless communication system, the AMF entity comprising:

a transceiver; and a controller coupled with the transceiver, and configured to:

receive, from a Session Management Function (SMF) entity, an MBS session request message including information on an MBS service area for an MBS session and information on a quality of service (QOS) of the MBS session, wherein the information on the MBS service area includes a list of tracking area identifiers (IDs), transmit, to a base station in the MBS service area, an N2 MBS session setup request message including the information on the MBS service area, receive, from the base station, an N2 MBS session setup response message including information reporting a successful establishment of MBS session resources for the base station and tunnel information of the base station associated with a user plane function (UPF) entity for the MBS session, and transmit, to the SMF entity, an MBS session response message, wherein the MBS session response message includes a success response indicating the successful establishment of MBS session resources for the base station in the MBS service area and the tunnel information for allocating a transport tunnel for the MBS session.

17. The AMF entity of claim 16, wherein the AMF entity supports the MBS based on the MBS service area in which the MBS session is provided.

18. The AMF entity of claim 16, wherein the information on the MBS service area further includes a list of cell IDs or geographical area information.

19. The AMF entity of claim 16, wherein the N2 MBS session setup request message further includes the information on the QoS of the MBS session.

20. The AMF entity of claim 16, wherein the MBS session is established based on the QoS of the MBS session.

* * * * *